United States Patent [19]

Hoffelner

[11] 4,437,428
[45] Mar. 20, 1984

[54] DEVICE FOR GENERATING SOUND WAVES AT RELATIVELY HIGH FREQUENCIES

[76] Inventor: Volkwin Hoffelner, Grillgasse 11, A-1110 Wien, Austria

[21] Appl. No.: 359,910

[22] Filed: Mar. 19, 1982

[30] Foreign Application Priority Data

Mar. 20, 1981 [AT] Austria .................... 1338/81

[51] Int. Cl.³ .................... B06B 1/00; G08B 3/00
[52] U.S. Cl. .................... 116/137 R; 116/22 A; 116/28 R; 116/62.3
[58] Field of Search .................... 116/56, 35 R, 58 R, 116/137 R, 57, 28 R

[56] References Cited

U.S. PATENT DOCUMENTS

| | | | |
|---|---|---|---|
| 1,540,023 | 6/1925 | Kollinek | 116/137 R |
| 2,570,081 | 10/1951 | Szezeniowski | 116/22 A X |
| 2,678,625 | 5/1954 | Hall et al. | 116/137 R |
| 3,103,911 | 9/1963 | Tappan et al. | 116/137 R |
| 3,156,212 | 11/1964 | Buell, Jr. | 116/22 A X |
| 3,186,999 | 6/1965 | Baxter | 116/62 A X |
| 4,150,637 | 4/1979 | Penick | 280/227 |
| 4,215,646 | 8/1980 | Williams | 116/58 X |
| 4,252,076 | 2/1981 | Williams | 116/137 R |

FOREIGN PATENT DOCUMENTS

| | | | |
|---|---|---|---|
| 2394090 | 2/1979 | France | 116/62.3 |
| 560617 | 4/1975 | Switzerland | 116/57 |

*Primary Examiner*—Daniel M. Yasich
*Attorney, Agent, or Firm*—Fleit, Jacobson, Cohn & Price

[57] ABSTRACT

A device for generating warning signals consisting of sound waves at frequencies between 14 and 26 kHz, preferably intended to be mounted on a motor vehicle so that the device will be actuated by the wind. The device operates similar to a flue pipe and generates a subatmospheric pressure behind the sharp edge of the flue pipe. The subatmospheric pressure is created by a passage continuing to a resonant chamber, open at its rear end, the passage being larger in cross-section than the resonant chamber. The passage is formed in a body which has substantially the shape of a frustum of a cone and is formed with longitudinal through slots which extend from the passage. With this design, a subatmospheric pressure is generated which excites the pipe to vibrate even in a relatively slow wind.

9 Claims, 7 Drawing Figures

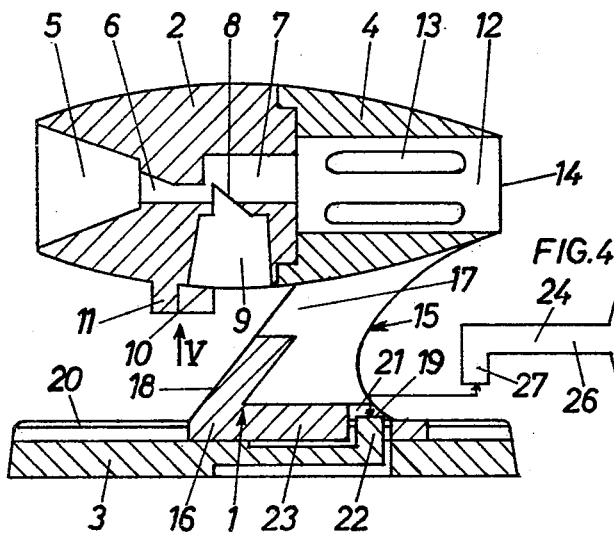
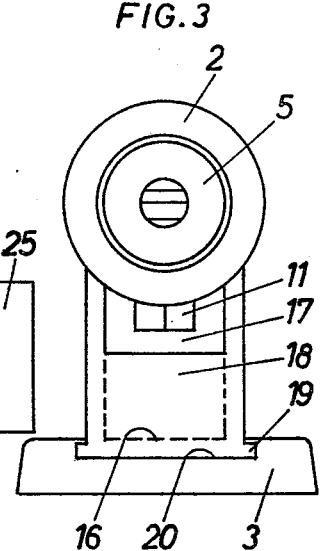
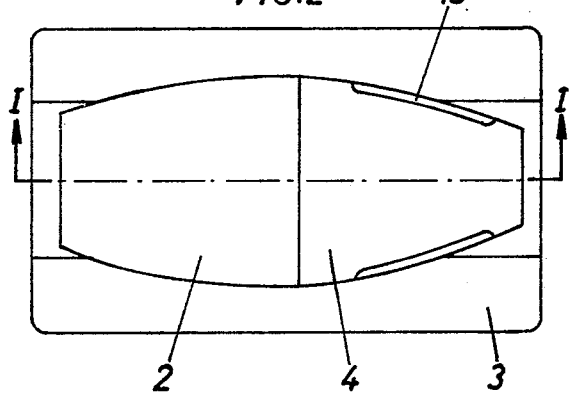
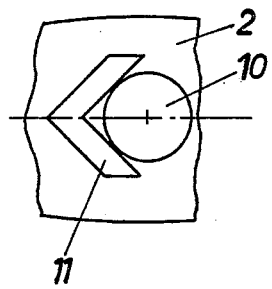
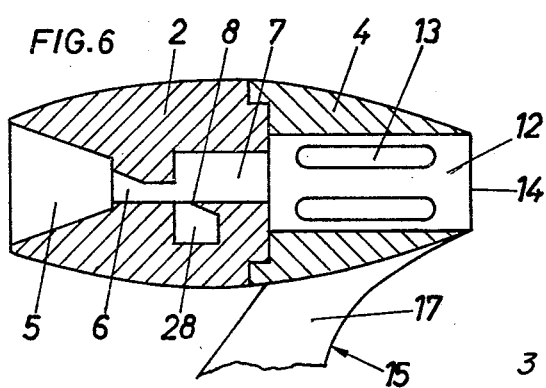
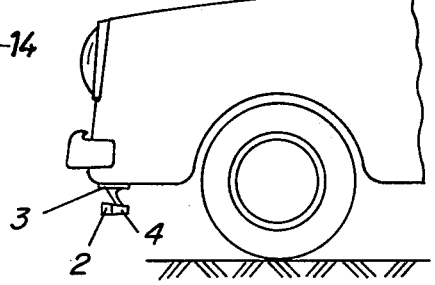

DEVICE FOR GENERATING SOUND WAVES AT RELATIVELY HIGH FREQUENCIES

SUMMARY OF INVENTION

A device for generating warning signals for wild animals, which signals consist of sound waves at relatively high frequencies in the range of 14 to 26 kHz, is preferably intended to be mounted on a motor vehicle and will be actuated by the wind. The device is similar to a flue pipe and generates warning signals even in a relatively slow wind.

This invention relates to a device for generating sound waves at relatively high frequencies of 14 to 26 kHz. The device is similar to a flue pipe and preferably intended to be mounted on a motor vehicle for actuation by the relative wind and comprises means for generating a subatmospheric pressure behind the sharp edge of the flue pipe.

It is an object of the invention to provide a whistle which can be mounted on a car and will respond even to the low pressure which is generated by the relative wind at a motor vehicle.

This requirement cannot be met by known whistles for generating sound waves at relatively high frequencies, e.g. in the range between 14 and 26 kHz, such as dog whistles, because they have a closed resonant chamber so that there will be a retention of air which can be overcome only by a relatively high air pressure.

Opened German Application No. 1,580,448 discloses a warning whistle which is of the kind discussed here and comprises an apron for generating a vacuum. That apron gives rise to undesired turbulence.

The object to provide a whistle which responds even to very low air pressures is accomplished in that, in a device of the kind described first hereinbefore the means for generating a subatmospheric pressure comprise in accordance with the invention a passage which continues the open resonant chamber of the flue pipe and is open at its rear and much larger in cross-section than the resonant chamber and is formed in a substantially frustoconical body, which has longitudinal through slots extending from the passage.

This design ensures a perfectly unhindered flow of air through the pipe so that the latter generates sound even at very low air pressures.

The design according to the invention affords the advantage that the relative wind produces a vacuum which assists the escape of air through the narrow blowing passage leading to the sharp edge.

Additional features and advantages of the device according to the invention will be explained herein after with reference to the drawing, which illustrates two different embodiments of the invention.

BRIEF DESCRIPTION OF THE DRAWINGS

FIG. 1 is a longitudinal sectional view taken on line II—II in FIG. 2,

FIG. 2 is a top plan view related to FIG. 1,

FIG. 3 is a front elevation,

FIG. 4 shows a tool consisting of an unlocking key for detaching the device from its holder, FIG. 5 is a fragmentary bottom view showing part of the devices viewed in the direction of the arrow V in FIG. 1 and FIG. 6 is a longitudinal sectional view showing the second embodiment.

FIG. 7 shows the present invention mounted on a motor vehicle.

DETAILED DESCRIPTION OF THE DRAWING

The device according to the invention as shown in FIGS. 1 and 2 comprises a bracket 1, a sound-generating body 2 and a baseplate 3. The sound-generating body 2 is substantially frustoconical and is connected by a merely diagrammatically indicated plug connector to the upper portion 4 of the bracket 1. These two members together constitute a unit which is shaped like a torpedo and constitutes the whistle proper.

The body 2 is formed at its forward end with an air inlet funnel 5, which is succeeded by a narrow blowing passage 6, which has the shape of a flat rectangle in cross-section. That blowing channel 6 flares to form a preferably resonant chamber 7, which is open at its rear. Closely behind the transition between the passage 6 and the resonant chamber 7, the sharp edge 8 is disposed, at which the sound is generated. A downwardly directed through opening which constitutes a horn 9 begins closely before the sharp edge 8 and has at its lower end a mouth 10. An apron 11 or the like cover is disposed in front of the mouth 10 and as is shown in FIG. 5 consists of two wall sections which include an obtuse angle.

The bracket 1 is formed in its upper portion 4 with a cylindrical cavity or passage 12, which is open at both ends and coaxial to the cavity 7 and defined by walls that may be formed with slots or other apertures 13. The rear opening of the passage 12 is designated 14.

In addition to the above-mentioned upper portion 4, the bracket 1 comprises an arm 15 and a foot 16. The arm 15 is formed with a substantially rectangular window 17, which is defined at its top by the underside of the upper portion 4 of the bracket 1. A beveled surface 18 is provided below the window 17 and disposed exactly under the mouth 10 of the horn 9 and forms a continuation of the latter and serves to deflect the sound.

The foot 16 is provided on each longitudinal side with a guide rib 19 for insertion into an undercut or dovetail-shaped guide 20 in the baseplate 3.

The bracket 1 with the whistle can be locked to the baseplate 3 because the foot 16 has a bore 21 for receiving a locking pin 22, which is disposed at the end of a resilient tongue 23. The tongue 23 is preferably integral with the baseplate 3 made of plastic material. Parts 1 and 2 consist preferably also of plastic material.

The key 24 shown in FIG. 4 is required for permitting an insertion of the foot 16 into the guide 20 until the pin 22 snaps into the bore 21, as well as for unlocking of the foot. The key 24 comprises a handle 25, a shank 26 and a bit 27, which protrudes at right angles from the shank 26 and can be inserted into the bore 21 of the foot 16 in order to force the locking pin 22 out of the bore 21 when it is desired to push the foot 16 out of the baseplate 3. When it is desired to insert the foot as far as is required, it will be sufficient to insert the foot until it engages the pin 22, then to depress the pin 22 by means of the key 24, and to push in the foot further until the pin 22 has snapped into the bore 21.

The embodiment shown in FIG. 6 is highly similar to the embodiment shown in FIGS. 1 to 3 and 5 and has instead of the horn 9 a closed resonant chamber 28 closely below the sharp edge 8. In this embodiment the beveled surface 18 and the apron 11 are omitted.

FIG. 7 shows a position for locating the devices described at FIGS. 1 through 6. The device is attached at a front area of a motor vehicle with the inlet funnel of the sound generating body facing in the direction of forward motion of the motor vehicle.

The device according to the invention has the following mode of operation:

The whistle proper is constituted by the torpedolike unit. The relative wind enters through the funnel 5 and is directed by the latter to the flat blowing passage 6. The air strikes the sharp edge 8 and is divided at the latter into two streams, which respectively enter the horn 9 and the passage 12, which is open at its rear and serves to generate vibrations. Part of the air which has entered the resonant chamber 7 flows into the passage 12, which has a diameter that is a multiple of the diameter of the resonant chamber 7. This abrupt increase in cross-section is necessary to ensure that the passage 12 will not change the vibrations formed owing to the length of the chamber 7 or assist in generating said vibrations. The air flowing through the passage 12 escapes through the opening 14 or through the lateral slotlike or other apertures 13. The entire rear portion of the whistle is so designed that the wind flowing over said portion generates in the passage 12 a subatmospheric pressure so that the rate of air flowing through the whistle is increased. The sound waves at relatively high frequencies which emerge from the horn 9 are deflected forwardly by the beveled surface 18. The relative wind is also incident on the surface 18 and flows through the window 17 so that the air will not apply pressure into the horn 9. The apron 11 disposed under the sound exit opening (mouth 10) serves also to generate a subatmospheric pressure in that region.

The embodiment shown in FIG. 6 has also the open passage for the flow of air as described hereinbefore.

It will be understood that additional modifications of the embodiments shown and described are possible within the scope of the invention.

What is claimed is:

1. A device for generating sound waves for use with a motor vehicle, said device comprising:
   a frustoconical body;
   means for mounting said body on said motor vehicle; and
   a flue pipe within said body adapted for channelling an air stream to generate sound waves, said flue pipe comprising:
   an inlet funnel for initially receiving said air stream;
   a blowing passage for receiving air from said inlet funnel;
   a resonant chamber for receiving air from said blowing passage;
   a sharp edge in said resonant chamber for interrupting the flow of said air stream;
   a horn for receiving air from said resonant chamber for producing sound waves; and
   a passage for receiving air from said resonant chamber, said passage being larger in cross-section than said resonant chamber.

2. A device as claimed in claim 1, wherein said passage contains longitudinal slots extending through said body.

3. A device as claimed in claim 1, wherein said generated sound waves are in the frequency of 14 to 26 kHz.

4. A device as claimed in claim 1, wherein said horn extends in a generally perpendicular direction from said resonant chamber.

5. A device as claimed in claim 4, wherein said horn extends through said body and an apron extends from said body adapted for blocking oncoming air from entering a mouth of said horn.

6. A device as claimed in claim 5, wherein said means for mounting comprises a bracket with a beveled surface adapted for deflecting the sound waves emitted from said mouth of said opening.

7. A device as claimed in claim 5, wherein said means for mounting comprises a bracket with an arm adapted for carrying said body, said arm containing a rectangular window adapted for deflecting the sound waves emitted from said mouth of said horn.

8. A device as claimed in claim 5, wherein said means for mounting comprises a bracket with a beveled surface and an arm with a rectangular window, said beveled surface and said rectangular window are adapted for deflecting the sound waves emitted from said mouth of said horn.

9. A device as claimed in claim 1, wherein said body forms a unit in a torpedo shape.

* * * * *